United States Patent
Sasaki

(10) Patent No.: US 6,740,353 B1
(45) Date of Patent: May 25, 2004

(54) PROCESS FOR PRODUCING MAGNETIC RECORDING MEDIUM

(75) Inventor: Hideki Sasaki, Nagano (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 09/830,554

(22) PCT Filed: Sep. 7, 2000

(86) PCT No.: PCT/JP00/06116

§ 371 (c)(1),
(2), (4) Date: May 4, 2001

(87) PCT Pub. No.: WO01/20602

PCT Pub. Date: Mar. 22, 2001

(30) Foreign Application Priority Data

Sep. 10, 1999 (JP) .......................................... 11-257643

(51) Int. Cl.⁷ ................................................. B05D 5/12
(52) U.S. Cl. ...................... 427/130; 427/131; 427/132; 427/345; 427/358; 427/385.5; 427/407.1
(58) Field of Search ................................ 427/130, 131, 427/132, 358, 385.5, 407.1, 345

(56) References Cited

U.S. PATENT DOCUMENTS

| | | | | |
|---|---|---|---|---|
| 4,332,840 A | * | 6/1982 | Tanaka et al. ............... | 427/130 |
| 5,336,559 A | | 8/1994 | Yamagishi et al. | |
| 5,382,687 A | * | 1/1995 | Morishita et al. ........... | 564/319 |
| 5,433,973 A | * | 7/1995 | Wallack et al. .............. | 427/128 |
| 5,462,823 A | * | 10/1995 | Evans et al. .................. | 430/14 |
| RE36,220 E | * | 6/1999 | Mori et al. .................. | 428/141 |
| 6,153,295 A | * | 11/2000 | Nishizawa et al. .......... | 428/323 |
| 6,207,252 B1 | * | 3/2001 | Shimomura ................. | 428/141 |

FOREIGN PATENT DOCUMENTS

| | | |
|---|---|---|
| EP | 0865034 A1 | 9/1998 |
| JP | 62028931 A | 2/1987 |
| JP | 62092132 A | 4/1987 |
| JP | 05120676 A | 5/1993 |
| JP | 07287843 A | 10/1995 |
| JP | 08-266984 A1 | 10/1996 |
| JP | 10302243 A | 11/1998 |
| JP | 10312525 A | 11/1998 |
| JP | 11045437 A | 2/1999 |
| JP | 2000126673 A | 5/2000 |

OTHER PUBLICATIONS

Supplemental European Search Report dated Oct. 1, 2002.
Office Action dated October 30, 2003.

* cited by examiner

Primary Examiner—Bernard Pianalto
(74) Attorney, Agent, or Firm—Rader, Fishman & Grauer PLLC

(57) ABSTRACT

A process for producing a magnetic recording medium having a non-magnetic layer on a non-magnetic support and having a magnetic layer on the non-magnetic layer is provided.

A process for producing a magnetic recording medium which comprises applying a non-magnetic layer coating material onto a non-magnetic support and drying the coating material to form a non-magnetic layer, and then applying a magnetic layer coating material more excessively than an intended magnetic layer-wet thickness onto the non-magnetic layer by using a die nozzle coating followed by scraping excess amounts of the magnetic layer coating material to the intended magnetic layer-wet thickness by means of a bar to form a magnetic coating layer.

11 Claims, No Drawings

PROCESS FOR PRODUCING MAGNETIC RECORDING MEDIUM

TECHNICAL FIELD

The present invention relates to a process for producing a magnetic recording medium having a non-magnetic layer on a non-magnetic support and having a magnetic layer on the non-magnetic layer.

BACKGROUND ART

In recent years, the magnetic recording medium such as VTR tapes, audio tapes, computer tapes, etc. is required for high-density recording for increased performance, recording longer time, and reduced size and weight, and a magnetic recording system in which an MR head and a magnetic tape are combined is begun to be investigated.

As recording density is higher, a magnetic layer is thinning. For example, Japanese Examined Patent Publication No. 5-59490 (1993) discloses a simultaneous overlapping coating method of a non-magnetic lower coating layer and a magnetic layer onto a non-magnetic support with regard to a process for producing a magnetic recording medium having a thin magnetic layer with a thickness of 2 $\mu$m or less.

However, if a magnetic layer having a thickness of 0.08 $\mu$m or less is tried to be obtained by such a wet-on-wet coating, nonuniformity of a thickness of the magnetic layer has a significant impact on output variations.

For cases with a combination with the MR head reproducing system taken into account, for example, in Japanese Laid-open Patent Publication No. 10-312525 (1998), there is disclosed that the saturated magnetic flux density of the magnetic layer with the hexagonal ferrite powder is 300G to 1000G and the coercive force is 2000 Oe or more, or the saturated magnetic flux density of the magnetic layer with ferromagnetic metal powder is 800G 1500G and the coercive force is 2000 Oe or more. In Japanese Laid-open Patent Publication No. 10-302243 (1998), there is disclosed that the projection height on the magnetic layer surface and the reversal-volume of magnetization are prescribed and the coercive force of the magnetic layer is 2000 Oe or more.

However, in both Publications mentioned above, there is no detailed description in the relationship suited for an MR head between magnetic characteristics and a thickness of the magnetic layer, and there has not yet been obtained a magnetic layer having a sufficient sensitivity suited for the MR head. Also, according to Examples of the both Publications, though a magnetic layer having a thickness of 0.15 $\mu$m is prepared by the simultaneous overlapping coating method, it is difficult to thin a layer with a higher uniformity.

DISCLOSURE OF THE INVENTION

Objects of the Invention

Thus, an object of the present invention is to provide a process for producing a magnetic recording medium having a non-magnetic layer on a non-magnetic support and having a magnetic layer on the non-magnetic layer, by solving problems of the aforesaid prior art. Also, an object of the present invention is to provide a process for producing a magnetic recording medium having a magnetic layer that is a coating-type extremely thin layer and has a less thickness variation. Further, an object of the present invention is to provide a process for producing a magnetic recording medium suited for an MR (magneto-resistive) head reproducing system.

SUMMARY OF THE INVENTION

The present invention relates to a process for producing a magnetic recording medium having a non-magnetic layer on a non-magnetic support and having a magnetic layer on the non-magnetic layer.

The present invention is a process for producing a magnetic recording medium which comprises:

applying a non-magnetic layer coating material onto a non-magnetic support and drying the coating material to form a non-magnetic layer, and then applying a magnetic layer coating material more excessively than an intended magnetic layer-wet thickness onto the non-magnetic layer by using a die nozzle coating followed by scraping excess amounts of the magnetic layer coating material to the intended magnetic layer-wet thickness by means of a bar to form a magnetic coating layer.

In the present producing process, it is preferable to apply 2 to 20 times as large amounts of the magnetic layer coating material as the intended magnetic layer-wet thickness onto the non-magnetic layer by using the die nozzle coating.

In the present producing process, a solid component concentration of the magnetic layer coating material is preferably 10% by weight or less.

In the present producing process, it is preferable to disperse the magnetic layer coating material again by means of an online dispersion apparatus immediately before applying the magnetic layer coating material onto the non-magnetic layer.

In the present producing process, after the non-magnetic layer coating material is applied onto the non-magnetic support and dried, it is preferable to cure the coating material.

In the present producing process, it is preferable that a radiation curing type binder resin is contained in the non-magnetic layer coating material and, after applying the non-magnetic layer coating material onto the non-magnetic support and drying the coating material, radiation curing of the coating material is carried out.

MODES FOR CARRYING OUT THE INVENTION

A magnetic recording medium produced in the present invention has a lower non-magnetic layer between a non-magnetic support and a magnetic layer as a coating layer constituent. On the underside of the non-magnetic support, a back-coat layer is formed as required. Alternatively, the magnetic layers may be formed on both sides of the non-magnetic support. Here, in the present invention, a lubricant coating layer and/or various coating layers for protecting the magnetic layer may be formed on an upper magnetic layer as required. Also, on the surface of the non-magnetic support, on which the magnetic layer is to be formed, an undercoat layer (adhesion facilitating layer) may be formed for improving adhesion between the coating layer and the non-magnetic support.

[Lower Non-magnetic Layer]

In the present invention, when a thickness of a magnetic layer is extremely thin such as, for example, 0.02 to 0.08 $\mu$m, the magnetic layer alone suffers a lack of a lubricant in the coating layer. Accordingly, role of a lower non-magnetic layer is to allow the non-magnetic layer contain a lubricant and supply the lubricant from the lower non-magnetic layer to the magnetic layer. Further, a surface roughness of a support film may be extensively mitigated by the intervention of this lower non-magnetic layer, and as a result, a surface smoothness of the magnetic layer is improved.

Therefore, it is desirable to allow the non-magnetic layer contain a carbon black. By allowing the non-magnetic layer to contain the carbon black, the lubricant can be held in the layer. It also has a role to lower a surface electric resistance of the magnetic layer.

For the carbon black contained in the non-magnetic layer, which is not particularly limited, a carbon black having an average particle size of about 10 to 80 nm is preferable. For such carbon black, the known one such as furnace carbon black, thermal carbon black, acetylene black, etc. may be used. Further, it may be used in a single or in a combination.

The BET specific surface area of such carbon black is 50 to 500 $m^2/g$, preferably 60 to 250 $m^2/g$. The carbon black that can be used in the present invention may be referred to "Carbon Black Almanac," compiled by the Society of Carbon Black.

For the non-magnetic layer, in addition to carbon black, other non-magnetic powders may be used in combination. Examples of the other non-magnetic powders, which is not particularly limited, include α-iron oxide, α-alumina, $Cr_2O_3$, $SiO_2$, ZnO, $TiO_2$, $ZrO_2$, $SnO_2$ and the like. Among these, when a needle-like α-iron oxide having an average major axis length of 200 nm or less or a granular α-iron oxide having an average particle size of 20 to 100 nm is used in combination with the carbon black, thixotropy properties of the coating material prepared by the only carbon black can be alleviated, and the coating layer can be hardened. In addition, for an abrasive, when α-alumina or $Cr_2O_3$, having an average particle size of 0.1 to 1.0 μm, is used in combination with the carbon black, the strength of the non-magnetic layer is improved.

A composition ratio of the carbon black to the other non-magnetic powders is preferably 100/0 to 75/25 by weight ratio. When the composition ratio of the other non-magnetic powders exceeds 25 parts by weight, problems occur in surface electric resistance.

For a resin used for the lower layer coating material, a radiation curing type resin is desirable. Since the use of a thermosetting resin requires a thermosetting process after applying the non-magnetic layer, it is not preferable in view of problems such as deformation of a raw roll due to thermosetting. In the use of the thermosetting resin without thermosetting, when the magnetic coating material is applied thereon, the surface smoothness of the magnetic layer is degraded because a solvent is soaked into the non-magnetic layer and swelled the layer or the non-magnetic layer is dissolved. In the present invention, the magnetic coating material is applied onto the non-magnetic layer after curing the non-magnetic layer.

In the present invention, the radiation curing type binder resin is used for the binder resin of the lower non-magnetic layer, the lower non-magnetic layer coating material is applied, dried, and smoothened; then, radiation is irradiated, the three-dimensional crosslinking is allowed to be occurred; and then, the upper magnetic layer coating material is applied on the lower layer, and thereby a good result is able to be obtained. According to this process, since the lower non-magnetic layer has the three-dimensional crosslinking when the upper magnetic layer is formed, it is not subjected to swelling caused by an organic solvent. Consequently, because the magnetic coating material is able to be applied directly to the lower non-magnetic layer immediately after the lower non-magnetic layer is formed, continuation and simplification of the process is able to be achieved.

The radiation curing type binder resin used in the present invention is a resin containing one or more unsaturated double bonds in the molecular chains which generates radicals by radiation and cures by crosslinking or polymerizing.

Examples of the radiation curing type binder resin include many resins such as vinyl chloride type resin, polyurethane resin, polyester resin, epoxy type resin, phenoxy resin, fiber type resin, polyether type resin, polyvinyl alcohol type resin. Of these, vinyl chloride type resin and polyurethane resin are typical, and it is preferable to use the both in combination.

The radiation curing vinyl chloride type resin is synthesized by modifying a vinyl chloride type resin as a raw material to radiation functional type resin. For the vinyl chloride type resin as the raw material, the vinyl chloride type resin of which vinyl chloride content is preferably 60 to 100% by weight, in particular preferably 60 to 95% by weight. Examples of such vinyl chloride type resin include vinyl chloride-vinyl acetate-vinyl alcohol copolymer, vinyl chloride-hydroxyalkyl (meth)acrylate copolymer, vinyl chloride-vinyl acetate-maleic acid copolymer, vinyl chloride-vinyl acetate-vinyl alcohol-maleic acid copolymer, vinyl chloride-hydroxyalkyl (meth)acrylate-maleic acid copolymer, vinyl chloride-vinyl acetate-vinyl alcohol-glycidyl (meth)acrylate copolymer, vinyl chloride-hydroxyalkyl (meth)acrylate-glycidyl (meth)acrylate copolymer, vinyl chloride-hydroxyalkyl (meth)acrylate-allyl glycidyl ether copolymer, vinyl chloride-vinyl acetate-vinyl alcohol-allyl glycidyl ether copolymer, and the like. Especially, a copolymer of vinyl chloride and a monomer which contains epoxy(glycidyl) group is preferable. And, an average polymerization degree of the copolymer is preferably 100 to 900, and more preferably 100 to 600.

Furthermore, in order to improve dispersibility, it is preferable to introduce polar groups such as —$SO_4Y$, —$SO_3Y$, —POY, —$PO_2Y$, —$PO_3Y$, —COOY (Y represents H or alkaline metal), —SR, —$NR_2$, —$N^+R_3Cl^-$ (R represents H or hydrocarbon group), phosphobetaine, sulfobetaine, phosphamine, sulfamine, and the like into the copolymer by optional methods as required. Also, to improve heat stability, an introduction of epoxy group is preferable.

As methods for modifying the vinyl chloride type resin to radiation functional type resin, for resins having hydroxy group or carboxylic acid group, a modifying method by reacting the resin with a compound having (meth)acrylic group and carboxylic anhydride or dicarboxylic acid, a modifying method by reacting the resin with a reactant (adduct) of tolylene diisocyanate (TDI) and 2-hydroxyethyl methacrylate (2-HEMA), and a modifying method by reacting the resin with a monomer which has one or more ethylene unsaturated double bond and one isocyanate group in a molecule and has no urethane bond in the molecule are typical. Of these methods, the third one is excellent in modification easiness, and dispersibility and physical properties after modification, therefore the modification is preferably carried out by the third method. Said monomers include 2-isocyanate ethyl (meth)acrylate, and the like.

Acrylic groups or methacrylic groups in the binder molecule preferably exist 1 to 20, and more preferably 2 to 15 on average per molecule.

The radiation curing polyurethane resin is an urethane resin having at least one acrylic bond in its molecule, namely a polyurethane acrylate compound formed by bonding to a compound containing acrylic type double bonds through urethane bond.

The acrylic type double bond mentioned here represents a residue (acryloyl group or methacryloyl group) of acrylic acid, acrylic ester, acrylic amide, methacrylic acid, methacrylic ester, methacrylic amide, and the like.

As the compound (A) containing acrylic type double bonds, mono(meth)acrylates of glycol such as ethylene glycol, diethylene glycol, hexamethylene glycol, and the like; mono(meth)acrylates and di(meth)acrylates of triol compound such as trimethylolpropane, glycerin, trimetylolethane, and the like; mono(meth)acrylates, di(meth)acrylates and tri(meth)acrylates of tetra- or more valent polyol such as pentaerythritol, dipentaerythritol, and the like; acrylic type compounds containing hydroxy group such as, glycerin monoallyl ether, glycerin diallyl ether and the like are suitable. These acrylic type double bonds need to exist at least one and preferably 2 to 20 in the binder molecule.

The polyurethane acrylate resin is generally obtained by a reaction of a resin containing hydroxy group(B') and an acrylic type compound containing hydroxyl group(A') and a compound containing polyisocyanate(C').

Examples of the resin containing hydroxy group include polyalkylene glycols such as polyethylene glycol, polybutylene glycol, polypropylene glycol, and the like, alkylene oxide adduct of bisphenol A, polyether polyols (B') which has various kinds of glycols and hydroxyl groups at the terminal of the molecular chain. Of these, a polyurethane acrylate resin obtained by using polyether polyol (B') as one component is preferable.

Examples of carboxylic acid component of polyether polyol(B') include aromatic dicarboxylic acids such as terephthalic acid, isophthalic acid, orthophthalic acid, 1,5-naphthalic acid, and the like, aromatic oxycarboxylic acids such as p-oxybenzoic acid, p-(hydroxyethoxy)benzoic acid, and the like, aliphatic dicarboxylic acids such as succinic acid, adipic acid, azelaic acid, sebacic acid, dodecanoic dicarboxylic acid, and the like, unsaturated aliphatic acids and alicyclic dicarboxylic acids such as fumaric acid, maleic acid, itaconic acid, tetrahydrophthalic acid, hexahydrophthalic acid, and the like, tri- or tetra-carboxylic acids such as trimellitic acid, trimesic acid, pyromellitic acid, and the like.

Examples of glycol component of the polyester polyol (B') include ethylene glycol, propylene glycol, 1,3-propanediol, 1,4-butanediol, 1,5-pentanediol, 1,6-hexanediol, neopentyl glycol, diethylene glycol, diproylene glycol, 2,2,4-trimethyl-1,3-pentanediol, 1,4-cyclohexanedimethanol, ethylene oxide adducts and propylene oxide adducts of bisphenol A, etc., ethylene oxide and propylene oxide adduct of hydrogenated bisphenol A, polyethylene glycol, polypropylene glycol, polytetramethylene glycol, and the like. Also, tri- or tetra-ols such as trimethylolethane, trimetylolpropane, glycerin, pentaerythritol, and the like may be used in combination.

Examples of polyester polyol include, in addition to the examples mentioned above, lactone type polyesterdiol chain obtained by ring opening polymerization of lactone such as caprolactone.

Examples of polyisocyanate (C') used include disocyanate compounds such as 2,4-tolylene diisocyanate, 2,6-tolylene diisocyanate, p-phenylene diisocyanate, biphenylmethane diisocyanate, m-phenylene diisocyanate, hexamethylene diisocyanate, tetramethylene diisocyanate, 3,3'-dimethoxy-4,4'-biphenylene diisocyanate, 2,4-naphthalene diisocyanate, 3,3'-demethyl-4,4'-biphenylene diisocyanate, 4,4'-diphenylene diisocyanate, 4,4'-diisocyanate-diphenyl ether, 1,5-naphthalene diisocyanate, p-xylylene diisocyanate, m-xylylene diisocyanate, 1,3-diisocyanate methylcyclohexane, 1,4-isocyanate methylcyclohexane, 4,4'-diisocyanate dicyclohexane, 4,4'-diisocyanate cyclohexylmethane, isophorone diisocyanate, and the like, or triisocyanate compounds such as 2,4-tolylene diisocyanate-trimer, hexamethylene diisocyanate-trimer of 7 or lower mol % in all isocyanate groups, and the like.

Furthermore, in order to improve dispersibility, it is preferable to introduce polar groups such as —$SO_4Y$, —$SO_3Y$, —POY, —$PO_2Y$, —$PO_3Y$, —COOY (Y represents H or alkaline metal), —SR, —$NR_2$, —$N^+R_3Cl^-$ (R represents H or hydrocarbon group), phosphobetaine, sulfobetaine, phosphamine, sulfamine, and the like into the copolymer by optional methods as required. Also, to improve heat stability, an introduction of epoxy group is preferable.

On the other hand, apart from the above synthetic method of the radiation curing type urethane, modification of thermosetting type polyurethane resin as a raw material to radiation functional type resin may be carried out, in the same method as the vinyl chloride type resin.

Also, a radiation curing type monomer or an oligomer may be used as required, and the use of them enables the coating layer to have a higher crosslinking degree. The additional content is preferably 3 to 30 parts by weight, and more preferably 5 to 20 parts by weight with respect to the resin contained in the lower non-magnetic layer coating material. When the content is less than 3 parts by weight, the curing action of the coating layer by the addition is small, and when the content exceeds 30 parts by weight, the coating material is given a strong influence and this conversely results in a lower gloss. The radiation curing type monomer or oligomer may be added either after preparing the coating material or the time of dispersing.

The content of the radiation curing type binder in the lower non-magnetic layer is preferably 10 to 70 parts by weight, and more preferably 20 to 40 parts by weight with respect to 100 parts by weight of a total of the carbon black and the nonmagnetic powders. When the content of the binder is extremely small, the coating layer becomes brittle, and when the content of the binder is extremely large, a capacity to hold the lubricant is degraded.

Examples of radiation used in the present invention include an electron beam, γ ray, β ray, ultraviolet ray, etc., and the preferable one is the electron beam. An irradiation dose is preferably 1 to 10 Mrad and more preferably 3 to 7 Mrad. An irradiation energy (acceleration voltage) is preferably 100 kV or more. The radiation is desirably irradiated before winding after coating and drying, but it may be irradiated after winding.

In the lower non-magnetic layer of the present invention, the lubricant is preferably contained as required. For the lubricant, the known one such as higher fatty acids, higher fatty ester, paraffin, fatty amide, etc. may be used.

A coating material for forming the lower non-magnetic layer is prepared by adding an organic solvent to the above-mentioned components. There is no particular limit to the organic solvent used, and one or two kinds or more of various solvents such as ketone type solvents such as methyl ethyl ketone (MEK), methyl isobutyl ketone, cyclohexanone, etc., or aromatic type solvents such as toluene, etc. may be suitably chosen and used. An amount of the organic solvent added may be about 100 to 900 parts by weight with respect to 100 parts by weight of a total amount of a solid component (carbon black and various inorganic powders, etc.) and the binder.

A thickness of the lower non-magnetic layer is preferably 0.5 to 3.0 μm, and preferably 1.0 to 3.0 μm in particular. When the thickness is less than 0.5 μm, the magnetic layer tends to be subjected to the influence of a base surface roughness. Accordingly, a surface smoothness of the magnetic recording medium tends to be degraded, which in turn influences electromagnetic conversion characteristics. Further, when the non-magnetic layer is thinner, the durability tends to be degraded due to the shortage of amounts of the lubricant. On the other hand, when the thickness is 3 $\mu$m or more, it is not preferable in view of production because of degradation of coating properties at the time of applying.

[Magnetic Layer]

A magnetic layer is formed on the non-magnetic layer by applying, and comprises at least a magnetic powder and at least a binder.

For the magnetic powder, metal such as Fe, Co, Ni and the like or these alloy fine powder, iron carbide, etc. are preferable to be used. Hc of the magnetic powder is preferably 1400 Oe to 2600 Oe in considering characteristics of the MR head. The size of the magnetic powder is preferably an average major axis length of 0.15 $\mu$m or less, and more preferably 0.12 $\mu$m or less in order to reduce noises.

A content of the magnetic powder in the magnetic layer is 50 to 85% by weight, and preferably 55 to 75 % by weight with respect to the total magnetic layer. Further, in the magnetic layer, various additives including non-magnetic particles such as an abrasive, carbon black, etc. and/or various additives such as a lubricant, etc. may be contained as required.

For the binder in the magnetic layer, thermoplastic resin, thermosetting or reactive resin, electron beam sensitive type modified resin, etc. may be used, and its combination may be chosen and used in accordance with characteristics of the medium, conditions of producing process, etc.

Examples of the thermoplastic resin include polyfunctional polyethers such as (meth)acrylic resin, polyester resin, polyurethane resin, vinyl chloride type copolymer, acrylonitrile-butadiene type copolymer, polyamide resin, poly(vinyl butyral), nitrocellulose, styrene-butadiene type copolymer, polyvinyl alcohol resin, acetal resin, epoxy type resin, phenoxy type resin, polyether resin, polycaprolactone, etc., polyamide resin, polyimide resin, phenolic resin, polybutadiene elastomer, chlorinated rubber, acrylic rubber, isoprene rubber, epoxy modified rubber, etc.

Examples of the thermosetting resin include polycondensing one such as phenolic resin, epoxy resin, polyurethane curing type resin, urea resin, butyral resin, polymal resin, melanin resin, alkyd resin, silicone resin, acrylic reactive resin, polyamide resin, epoxy-polyamide resin, saturated polyester resin, urea formaldehyde resin, etc.

Of the above resins, the resin having hydroxyl group at terminal and/or side chain of the resin is suitable as the reactive type resin, because a crosslinking using polyIsocyanates or electron beam crosslinking modification may be easily utilized. In addition, acidic polar groups, basic polar groups, betaines, etc. such as —COOY, —SO$_3$Y, —OS$_3$Y, —OPO$_3$Y, —PO$_3$Y, —PO$_2$Y, —N$^+$R$_3$Cl$^-$, —NR$_2$, etc. may be contained as the polar group at terminal and/or side chain of the resin, and the resin containing these polar groups is suitable for improvement of dispersibility. These may be used individually in one kind or in combination of two or more kinds.

Among these resins, the resin is preferably used in a combination of vinyl chloride type copolymer with polyurethane resin as mentioned below. Examples the resin used in the present invention include vinyl chloride type copolymer, more particularly, vinyl chloride type copolymer of which a content of vinyl chloride is preferably 60 to 95 wt %, and preferably 60 to 90 wt % in particular, and the average polymerization degree thereof is preferably about 100 to 500. The polyurethane resin used in combination with such vinyl chloride type resin is especially effective in view of its excellence in abrasion resistance and adhesive properties to the support. In addition to these resins, the known various resins may be contained.

In addition, by the known methods, the resin formed by introducing (meth)acrylic type double bond to the above resins and conducting electron beam sensitive modification may be used. Further, a content of an electron beam functional group is 1 to 40 mol %, preferably 10 to 30 mol % in a component of hydroxyl groups, in view of stability in producing process, curing characteristics by electron beam, etc., and especially in the case of vinyl chloride type copolymer, an electron beam curing type resin having excellent both dispersibility and curing characteristics is able to be obtained by reacting a monomer so that the number of the functional group is to be 1 to 20 groups, and preferably 2 to 10 groups per one molecule.

A coating material for forming the magnetic layer may be prepared by adding organic solvents to each component mentioned above. There is no particular limitation to the organic solvent used and organic solvents similar to those used for the lower non-magnetic layer may be used.

A centerline average roughness (Ra) of the magnetic layer surface is, for example, 5.0 nm or less, and preferably 1.0 to 4.5 nm. When Ra is less than 1.0 nm, the surface is excessively smooth, and thereby the running stability is degraded, and troubles during running tend to occur frequently. On the other hand, when Ra exceeds 5.0 nm, the magnetic layer surface becomes rough, and thereby in the reproduction system using the MR type head, when there are projections on the surface of the upper magnetic layer, noise tends to be increased sporadically or intermittently by the effects.

[Back-coat Layer]

A back-coat layer is provided for improving the running stability and preventing electrification of the magnetic layer, etc. The back-coat layer preferably comprises 30 to 80% by weight of carbon black. When the carbon black content is excessively small, the electrification preventing effect tends to lower, and in addition, the running stability tends to lower. Also the light transmittance of the medium tends to increase, and thereby problems occur in the system for detecting the tape and by the change of light transmittance. On the other hand, when the carbon black content is excessively large, the strength of the back-coat layer lowers, and the running durability tends to degrade. Any kind of carbon black may be used if it is used in general, and the average particle size is preferably about 5 to 500 nm. The average particle size thereof is, in general, measured by a transmission type electron micrograph.

In the back-coat layer, besides the carbon black, non-magnetic inorganic powders such as various abrasives, etc. mentioned above in describing the magnetic layer may be contained in order to improve the mechanical strength. A content of the non-magnetic inorganic powder is preferably 0.1 to 5 parts by weight, and more preferably 0.5 to 2 parts by weight with respect to 100 parts by weight of carbon black. An average particle size of the non-magnetic inorganic powder is preferably 0.1 to 0.5 $\mu$m. When the content of this kind of the non-magnetic inorganic powder is excessively small, the mechanical strength of the back-coat layer tends to become insufficient, while if the content is excessively great, the wear rate of guides, etc. in the tape sliding passage tends to increase.

In addition to these, a dispersing agent such as surfactant, etc., a lubricant such as higher fatty acid, fatty acid ester, silicon oil, etc., and other various additives may be added as required.

A binder, a crosslinking agent, a solvent, etc. used for the back-coat layer may be the same as those used for the coating material for the magnetic layer mentioned above. A content of the binder is preferably 15 to 200 parts by weight, and more preferably 50 to 180 parts by weight with respect to 100 parts by weight of the total solid component except the binder. When the binder content is excessively large, friction with the medium sliding passage becomes excessively large, the running stability lowers, and hence running accidents tend to occur frequently. In addition, problems such as blocking with the magnetic layer, etc. tend to occur. When the binder content is excessively small, the strength of the back-coat layer lowers and the running durability tends to lower.

A thickness of the back-coat layer (after calendering) is 1.0 μm or less, and preferably 0.1 to 1.0 μm, and more preferably 0.2 to 0.8 μm. When the back-coat layer is excessively thick, friction with the medium sliding passage becomes too large, and hence the running stability tends to lower. On the other hand, when the back-coat layer is excessively thin, the surface smoothness of the back-coat layer lowers due to influence of the surface roughness of the non-magnetic support. Consequently, when the back-coat is thermo-cured, the surface roughness of the back-coat layer is transferred to the magnetic layer surface, resulting in lowering of the output in high-frequencies, S/N and C/N. When the back-coat layer is excessively thin, abrasion of the back-coat layer occurs during the running of the medium.

[Non-magnetic Support]

There is no particular limitation to materials used for a non-magnetic support. The material of the non-magnetic support may be selected from various flexible materials and various rigid materials corresponding to the object and made into a given shape and size such as a tape form corresponding to various standards. Examples of the flexible material include various type resins, for example, polyesters such as polyethylene terephthalate and polyethylene naphthalate, polyolefins such as polypropylene, polyamides, polyimides and polycarbonates.

[Manufacturing Process]

In the present invention, the magnetic recording medium may be manufactured by preparing respectively the coating materials for the lower non-magnetic layer and for the magnetic layer using the above-mentioned materials, applying the lower non-magnetic layer coating material onto the non-magnetic support, drying the material applied and preferably curing it by irradiating with radiation, and then, applying the magnetic layer coating material onto this lower non-magnetic layer, drying the material applied and carrying out smoothing treatment. In the present invention, wet-on-dry coating method is carried out.

For the coating method of the non-magnetic layer, the known various coating means such as gravure coating, reverse-roll coating, die nozzle coating, etc. may be used.

For the coating method of the magnetic layer coating material, it is preferable to apply in two steps. That is, firstly, the magnetic coating material is supplied more excessively than an intended wet thickness of the magnetic layer (thickness of coating liquid in a state that little solvent is evaporated) onto the raw roll where the non-magnetic layer has been coated, by using the coating means of die nozzle coating. The supply varies depending on deformation situations of the raw roll where the non-magnetic layer has been coated, a hardness of the base used, etc., and for example, the supply of about 2 to 20 times as large as amounts for forming an intended magnetic layer thickness. For the means by which the supply may be easily changed, die nozzle coating is suitable. Next, the magnetic coating material supplied excessively is scraped to the necessary thickness by means of a bar (rod) and removed the excess amounts of the coating material to form the magnetic coating layer. By adapting such a two-step coating system, nonuniformity of the thickness of the extremely thin magnetic layer may be minimized.

With regard to the solid component concentration of this magnetic coating material to be applied, it is necessary to minimize yield value of the coating material to 10% by weight or less and enhance leveling properties, considering that channel is left in the coating layer when the solid component concentration is high because of the use of a wire bar or a non-wire coater bar in which a channel is formed thereon. Since the magnetic coating material becomes extremely dilute solution at the time, flocculation tends to be occurred. Thus, it is preferable to disperse the coating material again by means of an online dispersion apparatus immediately before applying the coating material. For the method to disperse the coating material again, the known methods may be used, and especially an ultrasonic dispersion apparatus is desirable to be used.

In the present invention, it is preferable to orient magnetic particles in the magnetic layer by applying the magnetic field after the magnetic layer is formed. The orientation direction may be random in the case of disc medium, and may be parallel or vertical or slanting in the case of tape medium with respect to the running direction of the medium in accord with purposes. In order to orient to the specified direction, it is preferable to apply the magnetic field of 1000G or more with permanent magnet such as ferrite magnet or rare earth magnet, etc., electromagnet, solenoid, etc. or to use a plurality of these magnetic field generating means in combination. Furthermore, to achieve the highest orientation after drying, a suitable drying step may be effected in advance before orientation or orientation is carried out simultaneously with drying.

The magnetic coating layer that has undergone the orientation treatment after coating in this way is, in general, dried and fixed by known drying and evaporation means such as hot air, far infrared rays, electric heater, vacuum equipment, etc. equipped inside the drying furnace. The drying temperature is in the range from room temperature to about 300° C., and may be suitably selected in accord with the heat resistance of the non-magnetic support, kind and/or concentration of solvent, etc., and temperature gradient may be provided inside the drying furnace. In addition, the gas atmosphere inside the drying furnace may be, in general, air or inert gas.

After drying the magnetic layer in this way, calendering is carried out for surface smoothing treatment as required. For the calendering roll, a combination of heat-resistant plastic rolls such as epoxy, polyester, nylon, polyimide, polyamide, polyimideamide, etc. (rolls with carbon, metal, or other inorganic compounds kneaded may be used) and metal rolls (three to seven-high combination) may be used. Also, a combination of metal rolls only may be used. The treatment temperature is preferably 70° C. or higher, and more preferably 90° C. or higher. The linear pressure is preferably 200 kg/cm or higher, and more preferably 250 kg/cm or higher, and the treatment speed is in the range from 20 m/min to 900 m/min. In the present invention, further effects can be obtained by the treatment temperature of 100° C. or higher and the linear pressure of 250 kg/cm or higher.

The process for producing in the present invention may be applied for a magnetic recording medium having a non-magnetic layer onto a non-magnetic support, and having a magnetic layer onto the non-magnetic layer. The process for producing in the present invention may be preferably applied for a magnetic recording medium having an extremely thin magnetic layer with a thickness of, for example, 0.02 to 0.08 μm to obtain an extremely thin magnetic layer having a uniform thickness.

Examples of the magnetic recording medium having the extremely thin magnetic layer include, for example, a magnetic recording medium suited for a recording-reproducing system in which recorded signals are reproduced by an MR head, that is, a magnetic recording medium as follows:

A magnetic recording medium which has a non-magnetic layer containing at least binder resin on a non-magnetic support, and has a magnetic layer with a thickness of 0.02 to 0.08 μm onto the non-magnetic layer, wherein the magnetic layer is formed by applying a magnetic coating material onto the non-magnetic layer after the non-magnetic layer is applied, dried and cured, the magnetic layer comprises metal magnetic powders with an average major axis length of 0.15 μm or less, the product of a residual flux density of the magnetic layer Br (unit, G) and a thickness of the magnetic layer t (unit, μm), t×Br, is within a range from 50 to 250, and a surface roughness (Ra) of the magnetic layer is 5 nm or less.

The binder resin contained in the non-magnetic layer is preferably a radiation curing type binder resin.

As described, in the system using the MR head, a coating-type recording medium with excellent characteristics may be obtained by setting the magnetic layer have a thickness of 0.02 to 0.08 μm, and the product of the residual flux density of the magnetic layer Br (unit, G) and the thickness of the magnetic layer t (unit, μm), t×Br, is within the range of 50 to 250. When the thickness of the magnetic layer is less than 0.02 μm or the product, t×Br, is less than 50, a flux density generated from the magnetic layer is not sufficient, and the sensitivity is degraded. When the thickness of the magnetic layer is larger than 0.08 μm or the product, t×Br, exceeds 250, MR head elements are saturated magnetically. Also, noises may be reduced by setting the surface roughness of the magnetic layer (Ra) is 5 nm or less.

EXAMPLES

Hereafter, the present invention will be more specifically described by raising examples; however, the present invention is not limited to these examples.

Example 1

| <Lower layer coating material> | |
| --- | --- |
| Granular α-$Fe_2O_3$ | 55 parts by weight |
| (FRO-3: manufactured by Sakai Chemical Co., Ltd.) | |
| (average particle size = 30 nm, BET = 45 $m^2$/g) | |
| Carbon black | 30 parts by weight |
| (#45B: manufactured by Mitsubishi Chemical Co., Ltd.) | |
| (average particle size = 24 nm, BET = 125 $m^2$/g, DBP oil absorption = 47 ml/100 g) | |
| α-$Al_2O_3$ | 15 parts by weight |
| (AKP50: manufactured by Sumitomo Chemical Co., Ltd.) | |
| (average particle sized = 0.20 μm, BET = 8 $m^2$/g) | |

| -continued | |
| --- | --- |
| <Lower layer coating material> | |
| Electron beam curing vinyl chloride type copolymer | 12 parts by weight |
| (TB0246, 30% solution: manufactured by Toyobo Co., Ltd.) | |
| (polymerization degree = 300, polar group: —$SO_3K$ = 1.5 groups/molecule) | |
| Electron beam curing polyurethane resin | 4 parts by weight |
| (TB0242, 35% solution: manufactured by Toyobo Co., Ltd.) | |
| (Mn = 25000, polar group:phosphide = 1 groups/1 molecule) | |
| Trifunctional acrylic monomer | 2 parts by weight |
| (TA505: manufactured by Sanyo Kasei Co., Ltd.) | |
| Isocetyl stearate | 10 parts by weight |
| Butyl stearate | 4 parts by weight |
| MEK | 126 parts by weight |
| Toluene | 38 parts by weight |
| Cyclohexanone | 38 parts by weight |

After the above compositions were kneaded, dispersion of the kneaded compositions was performed by means of sand grinder mill to prepare a lower layer coating material.

| <Upper layer magnetic coating material> | |
| --- | --- |
| Metal magnetic powder | 100 parts by weight |
| (Hc = 2400 Oe, σ s = 143 emu/g, BET = 51 $m^2$g, PH = 10, average major axis length = 0.10 μm, Fe/Co = 100/30 (weight ratio), including Al and Y as additive elements) | |
| Vinyl chloride type copolymer | 14 parts by weight |
| (MR110: manufactured by Nippon Zeon Co., Ltd.) | |
| (polymerization degree = 300, polar group: —$SO_3K$ = 1.5 groups/molecule) | |
| Phosphobetaine-including polyurethane resin | 4 parts by weight |
| (Mw = 40000, concentration of polar groups = 1.5 groups/1 molecule) | |
| —$SO_3Na$-including polyurethane resin | 2 parts by weight |
| (Mn = 25000, concentration of polar groups = 1 group/1 molecule) | |
| Abrasive α-$Al_2O_3$ | 10 parts by weight |
| (AKP100: manufactured by Sumitomo Chemical Co., Ltd.) | |
| (average particle size = 0.06 μm, BET = 28 $m^2$/g) | |
| Carbon black | 3 parts by weight |
| (CF-9: manufactured by Mitsubishi Chemical Co., Ltd.) | |
| (average particle size = 40 nm, BET = 60 $m^2$g, DBP oil absorption = 64 ml/100g) | |
| Sorbitan monostearate | 3 parts by weight |
| Isocetyl stearate | 3 parts by weight |
| Butyl stearate | 2 parts by weight |
| MEK | 380 parts by weight |
| Toluene | 130 parts by weight |
| Cyclohexanone | 130 parts by weight |

After the above compositions were kneaded, dispersion was performed by means of sand grinder mill to prepare an upper layer magnetic coating material.

First, the lower layer coating material was applied by extrusion die nozzle method onto a PET film having a surface roughness (Ra) of 9 nm and a thickness of 62 μm so that a thickness of the material applied after drying was to be 1.5 μm. The material applied was dried at drying temperature of 100° C., and then electron beam irradiation (5 Mrad) was conducted. Further, the lower layer was formed onto the other surface of the film by the similar process to prepare a roll having the lower coating layers on both surfaces.

Next, 4 parts by weight of Coronate-L (manufactured by Nippon Polyurethane, Co., Ltd.), 580 parts by weight of MEK, and 200 parts by weight each of toluene and cyclohexanone were added to the upper layer coating material. In parallel with dispersing this coating material again by an ultrasonic dispersion apparatus, this coating material was applied by extrusion die nozzle method onto the roll where the lower layers had been applied, so that a thickness conversion after drying was to be 0.5 μm, and then excess amount of the coating material was scraped using a wire bar so that a thickness after drying was to be 0.05 μm. Thereafter, non-orientation processing was carried out by a non-orientation magnet followed by dryness at a drying temperature of 100° C., and then calendering treatment with a liner pressure of 300 kg/cm at 90° C. to complete the coating layer on one surface. Further, the magnetic coating layer was formed onto the other surface of the film by the similar process to prepare a raw roll having the magnetic layers on both surfaces.

Finally, this raw roll was stamped out in a disc form, and then thermosetting was conducted at a condition of 70° C. for 24 hours to produce a disc.

Comparative Example 1

The lower layer coating material was applied by die nozzle method onto a PET film having a surface roughness (Ra) of 9 nm and a thickness of 62 μm so that a thickness of the material applied after drying was to be 1.5 μm, and while the material was still wet, a coating material in which 4 parts by weight of Coronate-L (manufactured by Nippon Polyurethane, Co., Ltd.), 580 parts by weight of MEK, and 200 parts by weight each of toluene and cyclohexanone were added to the upper layer coating material was applied onto the wet material by extrusion die nozzle method, in parallel with dispersing the coating material again by an ultrasonic dispersion apparatus, so that a thickness after drying was to be 0.05 μm. Thereafter, non-orientation processing was carried out by a non-orientation magnet followed by dryness at a drying temperature of 100° C., and then calendering treatment with a liner pressure of 300 kg/cm at 90° C. followed by conducting electron beam irradiation (5 Mrad) to complete the coating layer on one surface. Further, the coating layer was formed onto the other surface of the film by the similar process to prepare a raw roll having the magnetic layers on both surfaces.

Finally, this raw roll was stamped out in a disc form, and then thermosetting was conducted at a condition of 70° C. for 24 hours to produce a disc.

<Evaluation for Nonuniformity of Thickness>

In order to evaluate nonuniformity of thickness, evaluation of the modulation was carried out using a ZIP drive with regard to each sample of Example 1 and Comparative example 1. The term "modulation" refers to a value represented by $$[(A-B)/(A+B)] \times 100(\%)$$

when a maximum output in one rotation of the disc is defined as A and a minimum output in one rotation of the disc is defined as B.

The modulation was 6% in the case of the sample of Example 1, on the other hand, the modulation was 20% in the case of the sample of Comparative example 1. Thus, the nonuniformity of the thickness was very little in the case of Example 1. The sample in which output variation is very little was obtained.

Example 2

A disc was prepared in the same manner as in Example 1 except that the thickness of the magnetic layer was changed to 0.07 μm in Example 1.

Example 3

A disc was prepared in the same manner as in Example 1 except that the thickness of the magnetic layer was changed to 0.03 μm in Example 1.

Example 4

A disc was prepared in the same manner as in Example 1 except that the magnetic powder was changed to a magnetic powder with an average major axis length of 0.15 μm in Example 1.

Example 5

A disc was prepared in the same manner as in Example 1 that the magnetic powder was changed to a magnetic powder with an average major axis length of 0.07 μm in Example 1.

<Evaluation of the Disc Samples>

With regard to each disc sample of Examples 1 to 5, measurement of a surface roughness, magnetic properties, electromagnetic conversion characteristics (SN ratio) was carried out as follows. The result is shown in Table 1.

(1) Centerline Surface Roughness Ra

By using TALYSTEP system manufactured by Tayler-Hobson Corp., measurement was performed at the condition; filter of 0.18 to 9 Hz; special stylus of 0.1×2.5 μm; needle pressure of 2 mg; scanning speed of 0.03 mm/sec; and scanning length of 500 μm.

(2) Magnetic Properties

By using a vibrating sample magnetometer (manufactured by Toei industries), measurement was performed at 10 kOe.

(3) Electromagnetic Conversion Characteristics (SN Ratio)

The MR head manufactured by TDK (recording: MIG head, gap 0.15 μm, reproducing: Ni-Fe element MR head) was mounted on a spinning stand, and measure was performed.

TABLE 1

|  | Example 1 | Example 2 | Example 3 | Example 4 | Example 5 |
|---|---|---|---|---|---|
| Magnetic powder major axis length (μm) | 0.10 | 0.10 | 0.10 | 0.15 | 0.07 |
| Magnetic layer thickness t (μm) | 0.05 | 0.07 | 0.03 | 0.05 | 0.05 |
| Br (G) | 2830 | 2890 | 2700 | 2780 | 2900 |
| t × Br | 142 | 202 | 81 | 139 | 145 |
| Surface roughness Ra (nm) | 3.8 | 3.5 | 4.0 | 4.2 | 3.5 |
| SN (dB) | 25 | 23 | 21 | 21 | 26 |

It can be seen from Table 1, each of the disc sample in Examples 1 to 5 has the SN of 20 dB or more, and is suitable for reproducing by the MR head. By the evaluation using practical MR head, it is suitable for reproducing by the MR head in the case that the SN value is 20 dB or more.

The present invention can be carried out in various other modes without departing from the spirit or essential characteristics thereof. Therefore, the above-described examples are merely illustrative in all respects, and must not be construed as being restrictive. Further, the changes that fall within the equivalents of the claims are all within the scope of the present invention.

INDUSTRIAL APPLICABILITY

According to the present invention, it is possible to produce a magnetic recording medium having a magnetic layer with a uniform thickness. According to the present invention, in particular, it is possible to obtain an extremely thin magnetic layer with restraining a nonuniformity of a thickness thereof to minimum, thereby providing a coating-type thin magnetic recording medium in which a thickness variation is little.

What is claimed is:

1. A process for producing a magnetic recording medium, which comprises:
    applying a non-magnetic layer coating material onto a non-magnetic support;
    drying the coating material to form a non-magnetic layer;
    radiation-curing the non-magnetic layer after drying the non-magnetic layer coating material; and
    applying a magnetic layer coating material more excessively than an intended magnetic layer-wet thickness onto the non-magnetic layer by using a die nozzle coating followed by scraping excess amounts of the magnetic layer coating material to the intended magnetic layer-wet thickness by means of a bar to form a magnetic coating layer.

2. The process for producing the magnetic recording medium according to claim 1, wherein 2 to 20 times as large amounts of the magnetic layer coating material as the intended magnetic layer-wet thickness is applied onto the non-magnetic layer by using the die nozzle coating.

3. The process for producing the magnetic recording medium according to claim 1, wherein a solid component concentration of the magnetic layer coating material is 10% by weight or less.

4. The process for producing the magnetic recording medium according to claim 3, which comprises dispersing the magnetic layer coating material again by means of an online dispersion apparatus immediately before applying the magnetic layer coating material onto the non-magnetic layer.

5. The process for producing the magnetic recording medium according to claim 1, wherein the bar is a wire bar or a non-wire coater bar in which a channel is formed thereon.

6. The process for producing the magnetic recording medium according to claim 1, wherein the magnetic recording medium has the magnetic layer With a dry thickness of 0.02 to 0.08 $\mu$m.

7. A process for producing a magnetic recording medium which comprises:
    applying a non-magnetic layer coating material onto a non-magnetic support;
    drying the coating material to form a non-magnetic layer;
    curing the non-magnetic layer after drying the non-magnetic layer coating material;
    preparing a magnetic layer coating material by dispersing a magnetic layer coating composition containing a magnetic powder, a binder and an organic solvent;
    dispersing the magnetic layer coating material again by means of an online dispersion apparatus; and
    immediately applying the magnetic layer coating material more excessively than an intended magnetic layer-wet thickness onto the non-magnetic layer by using a die nozzle coating followed by scraping excess amounts of the magnetic layer coating material to the intended magnetic layer-wet thickness by means of a bar to form a magnetic coating layer.

8. The process for producing the magnetic recording medium according to claim 7, wherein 2 to 20 times as large amounts of the magnetic layer coating material as the intended magnetic layer-wet thickness is applied onto the non-magnetic layer by using the die nozzle coating.

9. The process for producing the magnetic recording medium according to claim 7, wherein a solid component concentration of the magnetic layer coating material is 10% by weight or less.

10. The process for producing the magnetic recording medium according to claim 7, wherein the bar is a wire bar or a non-wire coater bar in which a channel is formed thereon.

11. The process for producing the magnetic recording medium according to claim 7, wherein the magnetic recording medium has the magnetic layer with a dry thickness of 0.02 to 0.08 $\mu$m.

* * * * *